C. R. BALLARD.
VALVE.
APPLICATION FILED MAR. 3, 1911.

1,022,171.

Patented Apr. 2, 1912.

WITNESSES
Stephen Wach.
H. C. Lyon

INVENTOR
Charles R. Ballard,
By Fredk W. Winter
Att'y.

COLUMBIA PLANOGRAPH CO., WASHINGTON, D. C.

UNITED STATES PATENT OFFICE.

CHARLES R. BALLARD, OF MIDWAY, PENNSYLVANIA.

VALVE.

1,022,171.  Specification of Letters Patent.  Patented Apr. 2, 1912.

Application filed March 3, 1911. Serial No. 611,969.

*To all whom it may concern:*

Be it known that I, CHARLES R. BALLARD, a resident of Midway, in the county of Washington and State of Pennsylvania, have invented a new and useful Improvement in Valves, of which the following is a specification.

This invention relates to valves for compressors, pumps and the like, and more particularly to outlet valves therefor, although the main features are also applicable to inlet valves.

The object of the invention is to provide for the purposes stated a valve of simple and durable construction, one which is noiseless in its action, which is so constructed that it can be easily attached to and removed from the cylinder head, and which is so constructed as to protect the spring and other portions from the dirt or grit in the fluid being compressed or pumped.

The invention comprises a valve constructed and arranged as hereinafter described and claimed.

Figure 1:
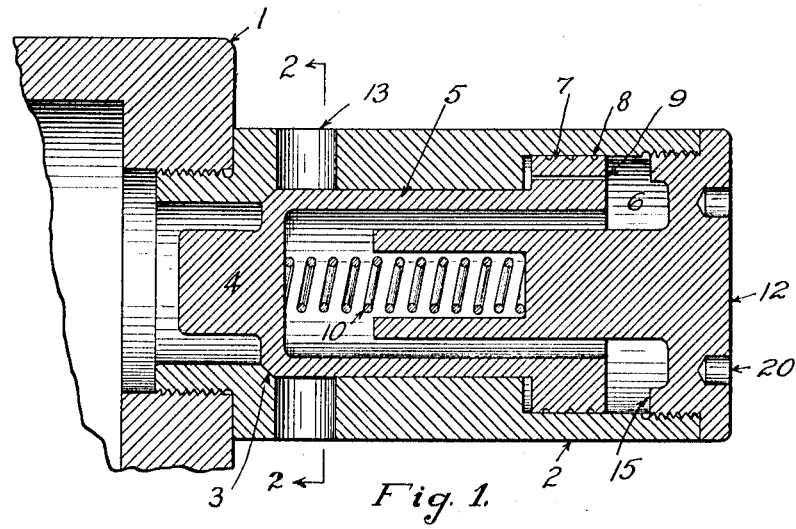
Figure 2:
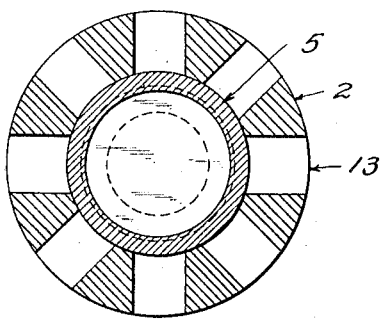
Figure 3:
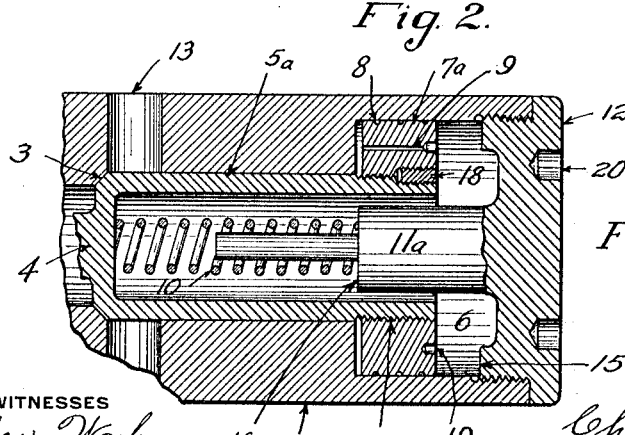

In the accompanying drawing Figure 1 is a longitudinal sectional view through the valve showing it attached to the cylinder head; Fig. 2 is a transverse section on the line 2—2, Fig. 1; and Fig. 3 is a central longitudinal section of a portion of the valve showing a modification.

In the drawing 1 indicates a portion of the head of a cylinder of an air compressor or similar apparatus.

The valve is shown as an outlet valve and comprises a casing 2 which at its inner end is open to the pump or compressor cylinder and is provided with a seat 3 with which coöperates valve 4. The latter is of hollow cylindrical construction, as shown, with its side walls 5 having a close sliding fit in the chamber in casing 2. The chamber in casing 2 is somewhat enlarged at its outer end to form a piston chamber 6, and the outer end of valve shell 5 is enlarged to form in effect a piston or head 7 having a fairly close fit in the chamber 6 in the casing and forming therewith a dashpot. The piston 7 may if desired be provided with a packing ring, or with packing grooves shown at 8. It may also, if desired, be provided with a port 9 extending therethrough to allow air to pass from one face to the other thereof. Obviously the piston 7 working in chamber 6 steadies the movement of valve 4 and prevents the same from closing so suddenly as to cause disagreeable noises. The valve is provided with a large cylindrical projection extending inwardly into the opening to the compressor cylinder to reduce clearance to a minimum.

The valve is normally held to its seat by means of spring 10 which is entirely inclosed within the hollow valve and therefore protected from the dirt or grit in the fluid being compressed or pumped and not liable to clog or become foul thereby. This spring at its inner end bears directly against valve 4, and at its outer end bears against the outer end of the hollow portion in stem 11 projecting inwardly from the cap 12 which closes the outer end of the casing, being threaded therein as shown. The outlet or inlet ports 13 are in the sides of the casing near its inner end.

Fig. 3 shows a modification wherein the piston 7ª instead of being integral with the shell 5ª of the valve is adjustable thereon, such as having a threaded connection therewith, as shown at 14, so as to permit said piston to be moved to various positions longitudinally on the valve and vary the extent of opening movement of the valve, which is limited by contact of piston 7 with the inner face 15 of the cap 12. In this case also the spring 10 surrounds the stem 11ª and has its outer end bearing against shoulder 16 on said stem. In order to lock the piston 7ª on the stem and prevent accidental rotation thereon I provide a key 18, preferably threaded into a hole formed partly in the piston 7ª and partly in the shell 5ª of the valve. In this case also the piston is preferably provided in its outer face with a pair of recesses 19 for receiving a spanner wrench or similar tool for turning the same on the valve stem to adjust it thereon. The cap 12 is also provided with recesses 20 for a similar purpose. The casing 2 is threaded at its inner end, as at 22, and is secured to the cylinder head by merely screwing it into a threaded opening therein.

The valve described is of solid compact construction and is supported entirely at its inner end, thereby dispensing with the usual complicated arrangement for fastening the valve to or in the cylinder head. The valve is entirely self-contained, and can be assembled and adjusted at the factory and in the field can be attached to the compressor or pump by any ordinary mechanic. Inasmuch as it is self-contained it can be removed from the pump and a new one placed thereon in a very short period of time thereby reducing the time necessary to shut down the compressor or pump. The valve is composed of a minimum number of parts which are all strong and of very simple shape so that breakage or derangement is not likely. The large cylindrical valve presents a large wearing surface so that wear is very largely reduced, and the spring is entirely housed in the valve proper so that it cannot be fouled or clogged by the dirt or other impurities in the fluid being compressed or pumped.

The valve described obviously can be adapted for an inlet valve as well as for an outlet valve.

What I claim is:

1. A self-contained outlet valve for compressors, pumps and the like, comprising a cylindrical one-piece casing having a bore enlarged at its outer end to form a piston chamber, said casing being provided at its inner end with means for attachment to a cylinder head and adjacent thereto with a valve seat and having ports through its side walls, a valve comprising a cylinder having its inner end closed to coöperate with said valve seat, said cylinder having a close sliding fit in said bore and being enlarged at its outer end to form a piston having a close sliding fit in said piston chamber and being provided with a restricted passage leading from one face of the piston to the other, a cap fitting in the outer open end of the bore to close the latter, said cap having a reduced central stem projecting inwardly into said bore, and a spiral spring seated between said stem and valve to seat the latter.

2. A self-contained valve for compressors, pumps and the like, comprising a one-piece cylindrical casing having a reduced forward end provided with screw threads for connection to a cylinder head, whereby the valve projects bodily from the cylinder head, said casing being provided with a bore reduced at its forward end to form a valve seat and enlarged at its rear end to form a piston chamber and provided to the rear of said seat with ports through its side walls, a valve comprising a hollow cylinder having a close sliding fit in said bore, said cylinder being closed at its forward end and formed to coöperate with the valve seat and enlarged at its rear end to form a piston sliding in said piston chamber, a cap secured to the outer end of said casing to close the latter, said cap having a stem projecting into said hollow cylinder, and a spiral spring seated in said hollow cylinder and engaging said stem and arranged to seat said valve, said valve having a reduced forward end substantially filling said bore to reduce clearance.

3. A self-contained valve for compressors, pumps and the like, comprising a one-piece casing provided at one end with means for attachment to a cylinder head and provided with a bore and ports through its side walls, said bore forwardly of said ports being formed with a valve seat and being enlarged at its rear end to form a piston chamber, a valve in said casing comprising a hollow cylinder having one end closed and formed to coöperate with said seat and being enlarged at its rear end to form a piston having a close sliding fit in said chamber, a cap screwed into the outer end of said casing and having a reduced hollow stem projecting forwardly into said cylinder, and a spiral compression spring seated in said hollow cylinder and hollow stem and arranged to seat said valve.

In testimony whereof, I have hereunto set my hand.

CHARLES R. BALLARD.

Witnesses:
F. W. Winter,
Mary E. Cahoon.

---

Copies of this patent may be obtained for five cents each, by addressing the "Commissioner of Patents, Washington, D. C."